United States Patent
Wang et al.

(10) Patent No.: US 7,832,058 B2
(45) Date of Patent: Nov. 16, 2010

(54) SWIVEL HINGE ASSEMBLY FOR FOLDABLE ELECTRONIC DEVICE

(75) Inventors: Jin-Xin Wang, Shenzhen (CN); Jian Li, Shenzhen (CN); Zhi-Guo Sun, Shenzhen (CN); Li-Jun Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 275 days.

(21) Appl. No.: 12/118,756

(22) Filed: May 12, 2008

(65) Prior Publication Data
US 2009/0144938 A1 Jun. 11, 2009

(30) Foreign Application Priority Data
Dec. 5, 2007 (CN) .......................... 2007 1 0202857

(51) Int. Cl.
*E05D 3/10* (2006.01)
(52) U.S. Cl. .............................. 16/367; 16/303; 16/330; 455/575.3; 379/433.13; 248/923
(58) Field of Classification Search .................... 16/367, 16/366, 282, 287, 294, 302, 303, 330, 341, 16/342; 455/575.3; 379/433.13; 361/679.27; 248/923
See application file for complete search history.

(56) References Cited

U.S. PATENT DOCUMENTS

| | | | | |
|---|---|---|---|---|
| 7,017,235 | B2 * | 3/2006 | Lu et al. | 16/367 |
| 7,380,313 | B2 * | 6/2008 | Akiyama et al. | 16/367 |
| 7,533,450 | B2 * | 5/2009 | Chien | 16/367 |
| 7,568,261 | B2 * | 8/2009 | Hsu et al. | 16/367 |
| 7,610,658 | B2 * | 11/2009 | Lee et al. | 16/367 |
| 2007/0174997 | A1 * | 8/2007 | Lu et al. | 16/367 |

* cited by examiner

*Primary Examiner*—William L. Miller
(74) *Attorney, Agent, or Firm*—Frank R. Niranjan

(57) ABSTRACT

An exemplary swivel hinge assembly (10) includes a bracket (12), a hinge mechanism (14), a hinge follower mechanism (16), and a swivel mechanism (18). The hinge mechanism (14) and the hinge follower mechanism (16) are configured to provide the swivel hinge assembly (10) with rotation about a first rotational axis. The hinge mechanism (14) includes a first pivot shaft (154), a first connecting member (142), a positioning ring (146), a ring follower (144), an elastic member (148), a cam (150), and a cam follower (152). The hinge follower mechanism (16) includes a second connecting member (162) and a second pivot shaft (166). The swivel mechanism (18) is connected to the bracket (12) and configured to provide the swivel hinge assembly (10) with rotation about a second rotational axis.

11 Claims, 6 Drawing Sheets

SWIVEL HINGE ASSEMBLY FOR FOLDABLE ELECTRONIC DEVICE

BACKGROUND OF THE INVENTION

1. Field of the Invention

The present invention generally relates to swivel hinge assemblies, and more particularly to a biaxial swivel hinge assembly typically used for foldable electronic devices.

2. Discussion of the Related Art

Generally, portable wireless terminals allow wireless communication with users of other portable wireless terminals. Such portable wireless terminals are mainly classified into bar-type, flip-type, and folder-type terminals according to the mechanical functionalities. The bar-type terminal includes a single housing having a bar-shape. The flip-type terminal includes a flip or a cover rotatably coupled to a bar-type housing by means of a hinge device. The folder-type terminal includes a folder rotatably and foldably coupled to a single bar-type housing by means of a hinge device.

The above-mentioned portable wireless terminals are well known to those skilled in the art, and typically include an antenna device, a data input/output device, and a data transmitting/receiving device. Generally, a keypad allowing data input data by pressing buttons on the keypad is mainly used as a data input device. A touch pad or a touch screen can also be used as a data input/output device. In addition, an LCD (Liquid Crystal Display) is mainly used as a data output device, i.e., a display device.

Nowadays, some portable wireless terminals are configured with additional functions such as cameras and camcorders, however, the display for data output is usually only rotatable about one axis. That is, the display can only be tilted relative to a horizontal pivot. When using the camera or camcorder to capture self-image or for video conference, the display usually needs to be pivoted about a vertical axis. Therefore the portable wireless terminal which can only tilt about the horizontal pivot are inconvenient to use.

Therefore, a portable wireless terminal having a display device that is rotatable about more than one axis is desired. More particularly, a swivel hinge assembly, which can connect a display unit to a main body of a portable wireless terminal, is desired.

SUMMARY

An exemplary swivel hinge assembly includes a bracket, a hinge mechanism, a hinge follower mechanism, and a swivel mechanism. The hinge mechanism and the hinge follower mechanism are configured to provide the swivel hinge assembly with rotation about a first rotational axis. The hinge mechanism includes a first pivot shaft, a first connecting member, a positioning ring, a ring follower, an elastic member, a cam, and a cam follower. The hinge follower mechanism includes a second pivot shaft and a second connecting member. The swivel mechanism is connected to the bracket and configured to provide the swivel hinge assembly with rotation about a second rotational axis.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present swivel hinge assembly. Moreover, in the drawings, like reference numerals designate corresponding parts throughout the several views, and all the views are schematic.

DETAILED DESCRIPTION OF THE EMBODIMENTS

Reference will now be made to the drawings to describe exemplary embodiments of the present swivel hinge assembly in detail.

The present application provides a swivel hinge assembly used in foldable electronic devices that include two components rotatably attached to each other such as mobile phones, personal digital assistants (PDAs), and digital videos (DVs). Hereinafter, for convenience and brevity, the swivel hinge assembly as used in a mobile phone is described and illustrated.

Figure 1:
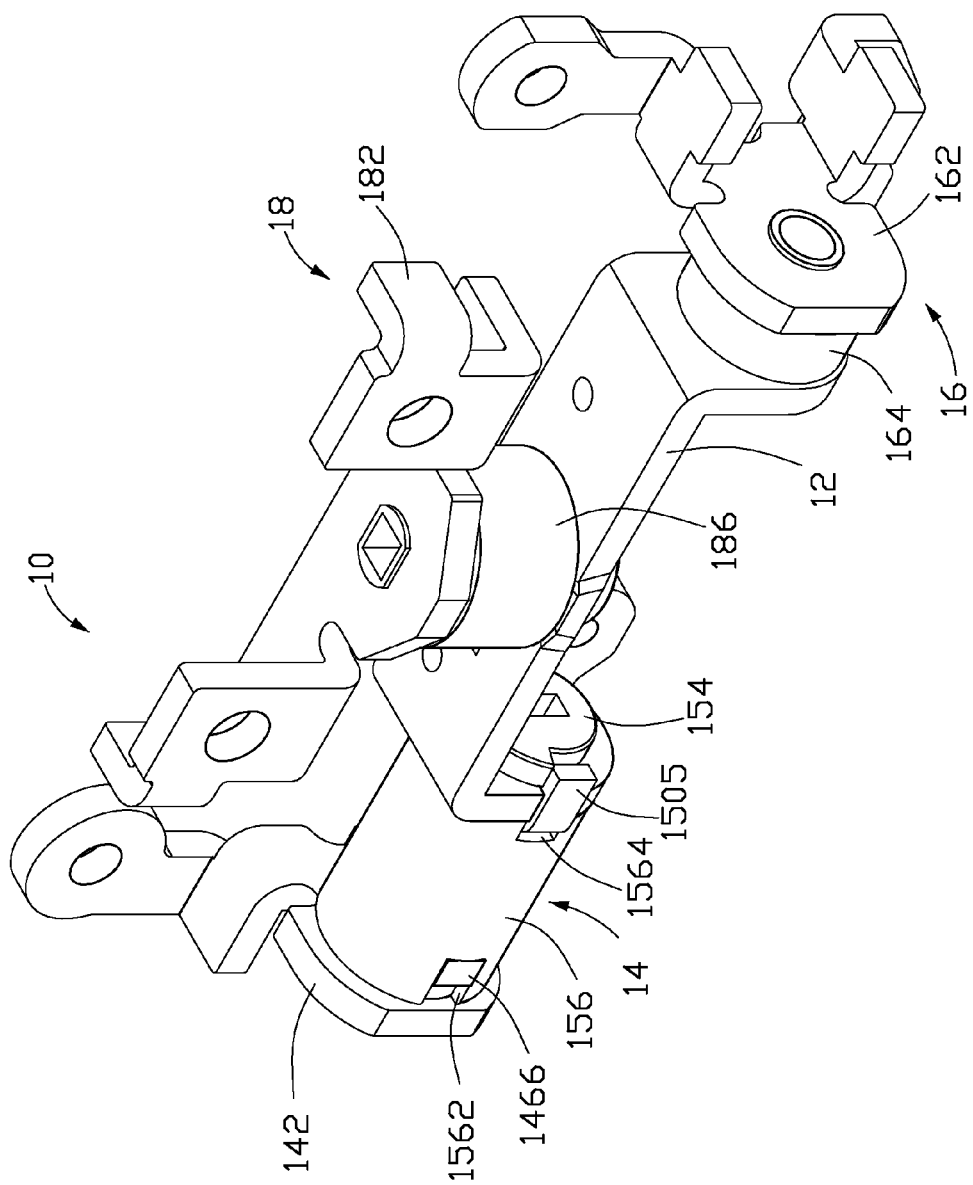
FIG. 1 is an assembled, isometric view of a swivel hinge assembly in accordance with an exemplary embodiment of the present invention.

Referring to FIG. 1, a swivel hinge assembly 10 of an exemplary embodiment includes a bracket 12, a hinge mechanism 14, a hinge follower mechanism 16, and a swivel mechanism 18. The swivel hinge assembly 10 provides rotation about a first rotational axis by the hinge mechanism 14 and the hinge follower mechanism 16, and rotation about a second rotational axis perpendicular to the first axis by virtue of the swivel mechanism 18.

Figure 2:
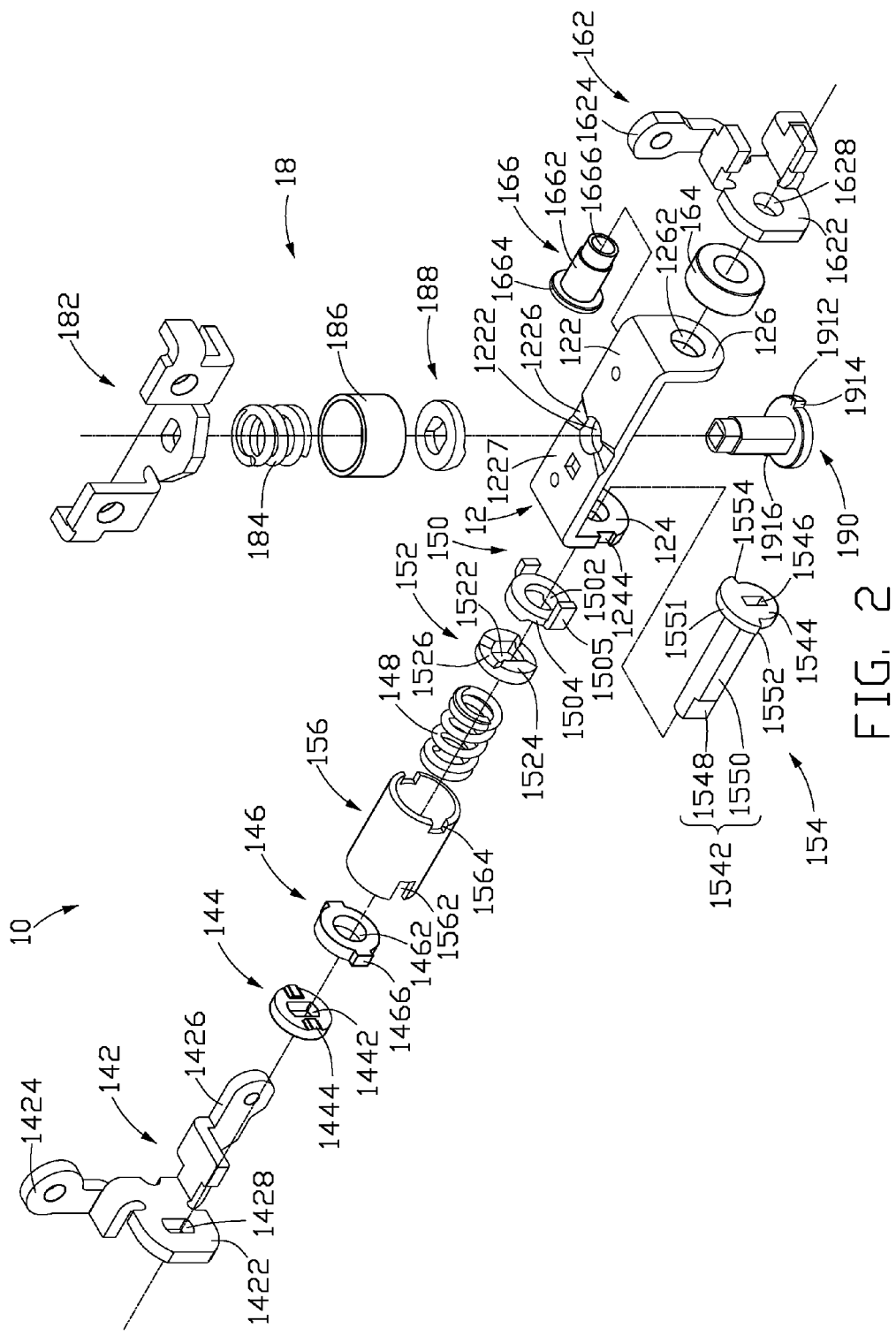
FIG. 2 is an exploded, isometric view of the swivel hinge assembly shown in FIG. 1.
Figure 3:
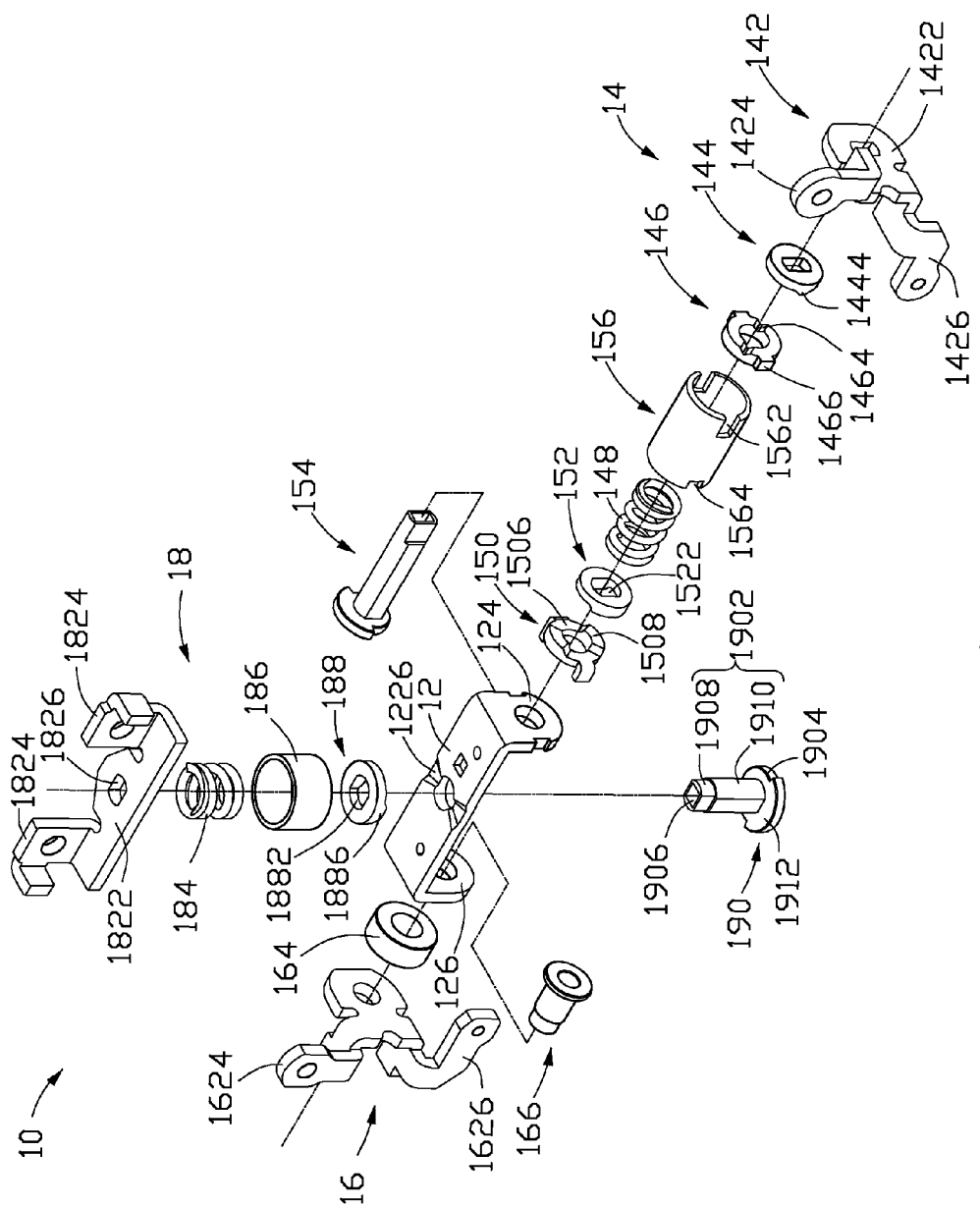
FIG. 3 is similar to FIG. 2, but viewed from another aspect.
Figure 4:
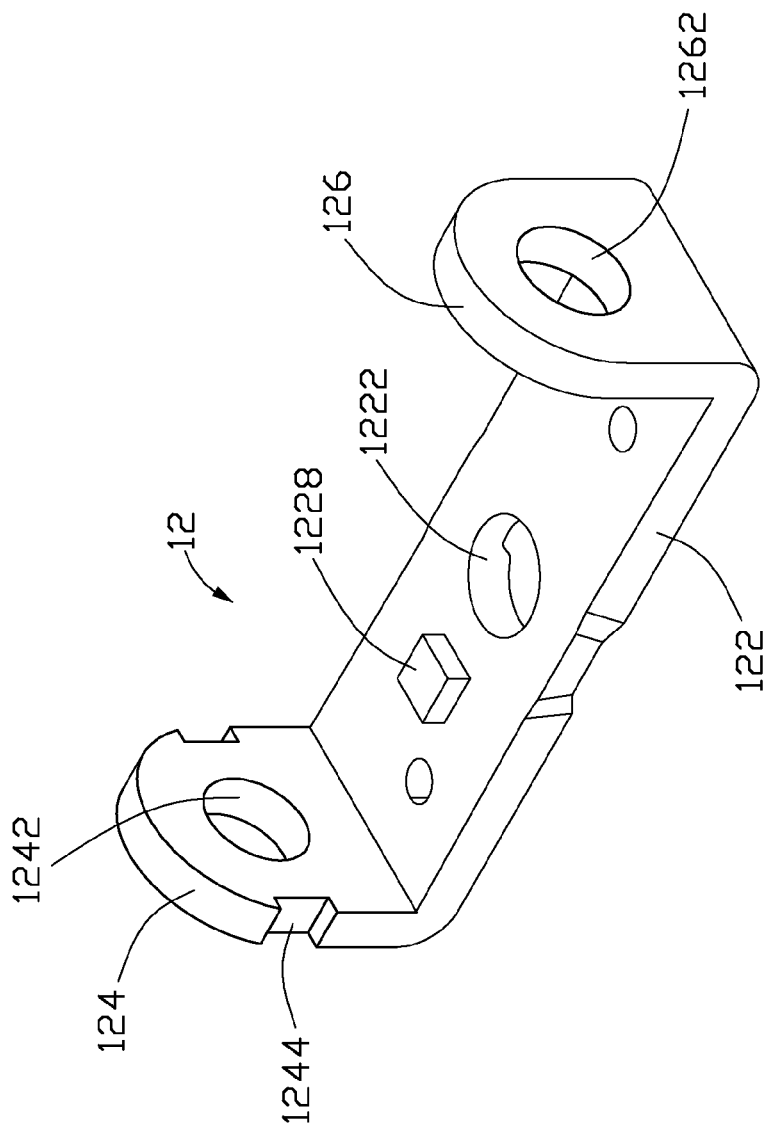
FIG. 4 is an isometric view of a bracket of the swivel hinge assembly of FIG. 1.
Figure 5:
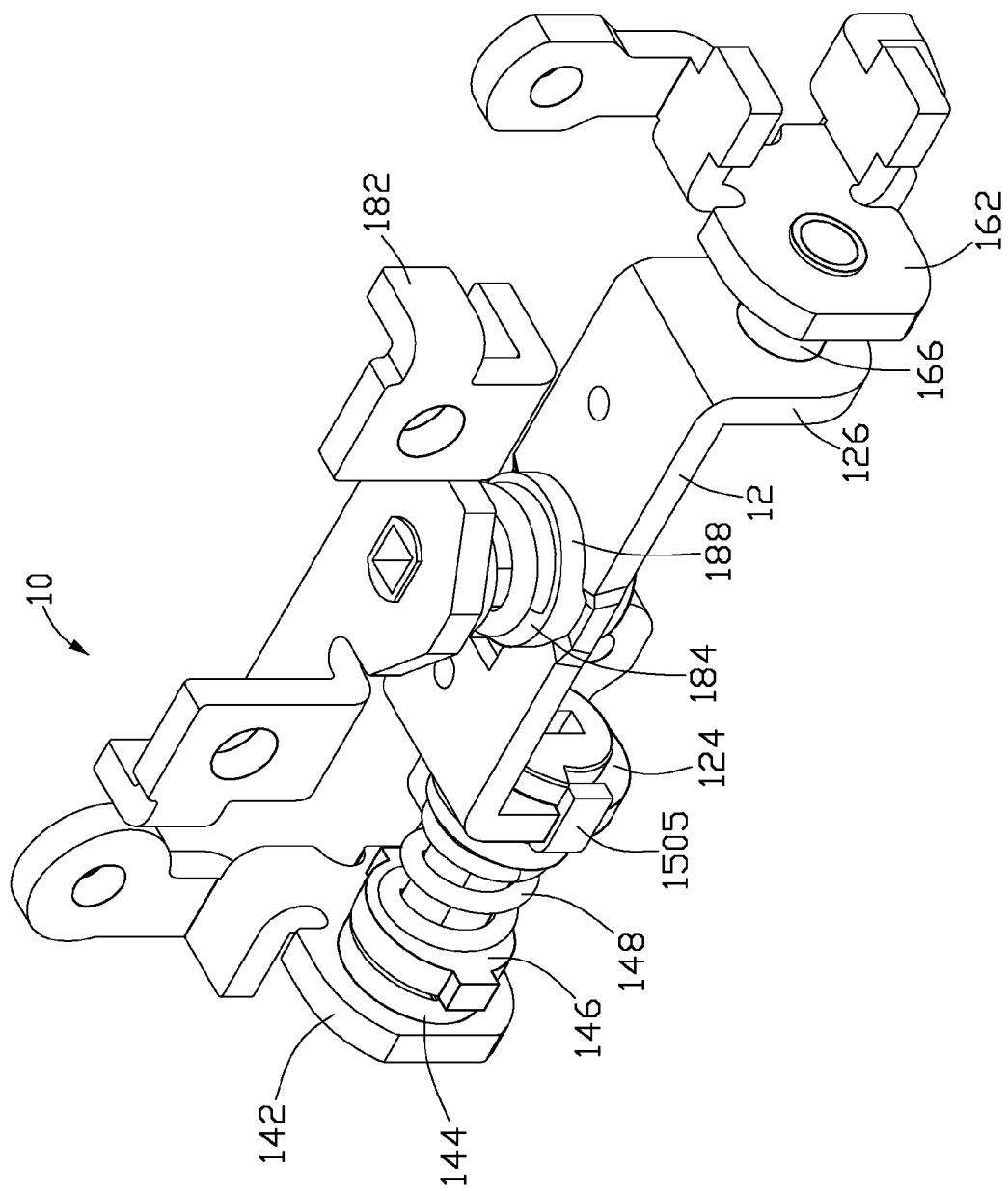
FIG. 5 is a partial assembled, isometric view of FIG. 1.

Referring to FIGS. 2 through 4, the bracket 12 includes a support board 122, with a first connecting portion 124 and a second connecting portion 126 perpendicularly extending from opposite ends of the support board 122 correspondingly. The support board 122 is substantially an oblong sheet, with a circular through hole 1222 defining in a center. A pair of symmetrical valleys 1226 are defined in a cam surface 1227 of the support board 122. A projection 1228 is formed on another surface (not labeled) of the support board 122 opposite to the cam surface 1227.

The first connecting portion 124 and the second connecting portion 126 extend toward a same side of the bracket 12. The first connecting portion 124 defines a circular through hole 1242 in a center and two engaging grooves 1244 on opposite sides of a rim. The second connecting portion 126 defines a circular through hole 1262 in a center.

The hinge mechanism 14 includes a first connecting member 142, a ring follower 144, a positioning ring 146, an elastic member 148, a cam 150, a cam follower 152, a first pivot shaft 154, and a sleeve 156.

The first connecting member 142 has a connecting portion 1422, with a first fixing portion 1424 and a second fixing portion 1426 perpendicularly extending from opposite ends of the connecting portion 1422. The connecting portion 1422 defines a double D latch hole 1428 for receiving an end of the first pivot shaft 154. Each of the first fixing portion 1424 and the second fixing portion 1426 defines a mounting hole (not labeled). The mounting holes are used for attaching the first connecting member 142 to a part of the mobile phone.

The ring follower 144 is substantially a circular sheet. A double D latch hole 1442 for engaging with the first pivot shaft 154 is defined in a center of the ring follower 144. A pair of protrusions 1444 are symmetrically formed on an end surface of the ring follower 144.

The positioning ring 146 is substantially a circular sheet, with a circular hole 1462 defined in a center. A pair of notches 1464 are symmetrically defined in an end surface of the positioning ring 146, and a pair of tabs 1466 extend out of an edge of the positioning ring 146. The notches 1464 are configured for engaging with the protrusions 1444 of the ring follower 144.

The elastic member 148 is a helical spring, and is extendable and compressible. Alternatively, a rubber bar or another kind of elastic piece may also be adopted as the elastic member 148.

The cam 150 includes a cam portion 1504, a tab 1505, and an engaging piece (not labeled). The cam 150 defines a center hole 1502 and has a cam surface 1506. A pair of peaks 1508 are formed on the cam surface 1506 of the cam 150. The tab 1505 and the engaging piece extend out of an edge of the cam portion 1504 and are opposite to each other. The tab 1505 is longer than the engaging piece. The tab 1505 and the engaging piece of the cam 150 are configured for engaging with the engaging grooves 1244 of the bracket 12, so that the cam 150 is non-rotatable relative to the bracket 12.

The cam follower 152 is substantially a hollow cylinder. A double D latch hole 1522 is defined in a center of the cam follower 152. The cam follower 152 has a cam surface 1524 for engaging with the cam surface 1506 of the cam 150. The cam surface 1524 defines a pair of valleys 1526 for engaging with the peaks 1508 of the cam 150 correspondingly. In alternative embodiments, the number of valleys 1526 of the cam follower 152 and corresponding number of peaks 1508 of the cam 150 may be any desired amount, such as one, three, four, five, or more.

The first pivot shaft 154 includes a shaft portion 1542, a cap 1544 disposed on an end of the shaft portion 1542, and a wiring channel 1546.

The shaft portion 1542 has a first deformed portion 1548 and a second deformed portion 1550. The second deformed portion 1550 is adjacent to the cap 1544. A diameter of the first deformed portion 1548 is smaller than that of the second deformed portion 1550. The first deformed portion 1548 is configured for engaging in the double D latch hole 1428 of the first connecting member 142 and the double D latch hole 1442 of the ring follower 144. The second deformed portion 1550 is configured for engaging in the double D latch hole 1522 of the cam follower 152. Therefore, the cam follower 152, the first connecting member 142, the ring follower 144, and the first pivot shaft 154 are non-rotatable relative to the first pivot shaft 154.

The cap 1544 is substantially flat. A block 1551 extends out of an edge of the cap 1544. The block 1551 has two opposite limiting surfaces 1552, 1554. The limiting surfaces 1552, 1554 are configured for resisting the tab 1505 of the cam 150 so as to restrict a rotational angle of the swivel hinge assembly 10 about the first rotational axis. A rotational range of the swivel hinge assembly 10 about the first rotational axis may be adjusted by adjusting positions of the limiting surfaces 1552, 1554 of the first pivot shaft 154.

The wiring channel 1546 extends through the shaft portion 1542 and the cap 1544, and is used for wiring components of the mobile phone.

The sleeve 156 is substantially a hollow cylinder. Two cutouts 1562 are defined on one end of the sleeve 156 at opposite sides of a sidewall. Two cutouts 1564 are defined on the other end of the sleeve 156 at opposite sides of the sidewall. The cutouts 1562 are configured for receiving the tabs 1466 of the positioning ring 146, and the cutouts 1564 are configured for receiving the tab 1505 and the engaging piece of the cam 150.

The hinge follower mechanism 16 includes a second connecting member 162, a sleeve 164, and a second pivot shaft 166. The second connecting member 162 has a connecting portion 1622, with a first fixing portion 1624 and a second fixing portion 1626 perpendicularly extending from opposite ends of the connecting portion 1622. The connecting portion 1622 defines a pivoting hole 1628 for receiving an end of the second pivot shaft 166. Each of the first fixing portion 1624 and the second fixing portion 1626 defines a mounting hole (not labeled) for attaching the second connecting member 162 to the mobile phone.

The sleeve 164 is substantially a hollow cylinder. The second pivot shaft 166 includes a pivot portion 1662, a cap 1664, and a wiring channel 1666 extending through the pivot portion 1662 and the cap 1664. The wiring channel 1666 is used for wiring the two components of the mobile phone.

The swivel mechanism 18 includes a third connecting member 182, an elastic member 184, a sleeve 186, a cam 188, and a third pivot shaft 190.

The third connecting member 182 includes a flat base 1822 and two tabs 1824 perpendicularly extending from the flat base 1822. The flat base 1822 defines a double D latch hole 1826. Each tab 1824 defines a mounting hole (not labeled) for attaching the third connecting member 182 to another part of the mobile phone.

The elastic member 184 is a helical spring and is extendable and compressible. Alternatively, a rubber bar or another kind of elastic piece may also be adopted as the elastic member 184. The sleeve 186 is substantially a hollow cylinder.

The cam 188 defines a double D latch hole 1882 and forms a pair of peaks 1886 on one end surface of the cam 188. The peaks 1886 are formed corresponding to the valleys 1226 of the bracket 12. In alternative embodiments, the number of peaks 1886 of the cam 188 and corresponding number of valleys 1226 of the bracket 12 may be any desired amount, such as one, three, four, five, or more.

The third pivot shaft 190 includes a shaft portion 1902, a cap 1904 formed on an end of the shaft portion 1902, and a wiring channel 1906 extending through the shaft portion 1902 and the cap 1904.

The shaft portion 1902 includes a first deformed portion 1908 and a second deformed portion 1910. The second deformed portion 1910 is adjacent to the cap 1904, and a diameter of the first deformed portion 1908 is smaller than that of the second deformed portion 1910. The first deformed portion 1908 is engaged in the double D latch hole 1826 of the third connecting member 182, and the second deformed portion 1910 is engaged in the double D latch hole 1882 of the cam 188, such that the third connecting member 182 and the cam 188 are both non-rotatable relative to the third pivot shaft 190.

The cap 1904 is substantially flat. A block 1912 extends out of an edge of the cap 1904. The block 1912 has two limiting surfaces 1914, 1916. The limiting surfaces 1914, 1916 are configured for resisting the projection 1228 of the bracket 12 so as to restrict a rotational angle of the swivel hinge assembly 10 about the second rotational axis. A rotational range of the swivel hinge assembly 10 about the second rotational axis may be adjusted by adjusting positions of the limiting surfaces 1914, 1916 of the third pivot shaft 190. The wiring channel 1906 is used for wiring the two components of the mobile phone.

Referring to FIGS. 2-5, in assembling of the swivel hinge assembly 10, the first pivot shaft 154 of the hinge mechanism 14 is extended through the circular through hole 1222 of the bracket 12, the center hole 1502 of the cam 150, the double D latch hole 1522 of the cam follower 152, the elastic member 148, the sleeve 156, and the circular hole 1462 of the positioning ring 146, in that order. After that, the ring follower 144 and the first connecting member 142 are fixed to an end of the first deformed portion 1548 of the first pivot shaft 154. The elastic member 148 is compressed, and two ends of the elastic member 148 respectively resist the positioning ring 146 and the cam follower 152. The cam surface 1506 of the cam 150 is engaged with the cam surface 1524 of the cam follower 152, with the peaks 1508 of the cam 150 receiving in the valleys 1526 of the cam follower 152. The protrusions 1444 of the ring follower 144 are received in the notches 1464 of the positioning ring 146. The limiting sheet 1505 and the engaging piece of the cam 150 are received in the engaging grooves 1244 of the bracket 12 and the cutouts 1564 of the sleeve 156. The limiting sheet 1505 resists the limiting surface 1552 of the first pivot shaft 154.

The second pivot shaft 166 of the hinge follower mechanism 16 is extended through the circular through hole 1262 of the bracket 12, with the cap 1664 of the second pivot shaft 166 resisting a side surface of the second connecting portion 126 of the bracket 12. The sleeve 164 is then placed over the second pivot shaft 166, and the second connecting member 162 is fixed to an end of the second pivot shaft 166.

Then the third pivot shaft 190 of the swivel mechanism 18 is extended through the hole 1222 of the bracket 12, the double D latch hole 1882 of the cam 188, the elastic member 184, and the sleeve 186. The third connecting member 182 is fixed to an end of the first deformed portion 1908 of the third pivot shaft 190. The peaks 1886 of the cam 188 are received in the corresponding valleys 1226 of the bracket 12, and the projection 1228 of the bracket 12 resists the limiting surface 1916 of the third pivot shaft 190. The swivel hinge assembly 10 is thus completely assembled, as shown in FIG. 1.

Figure 6:
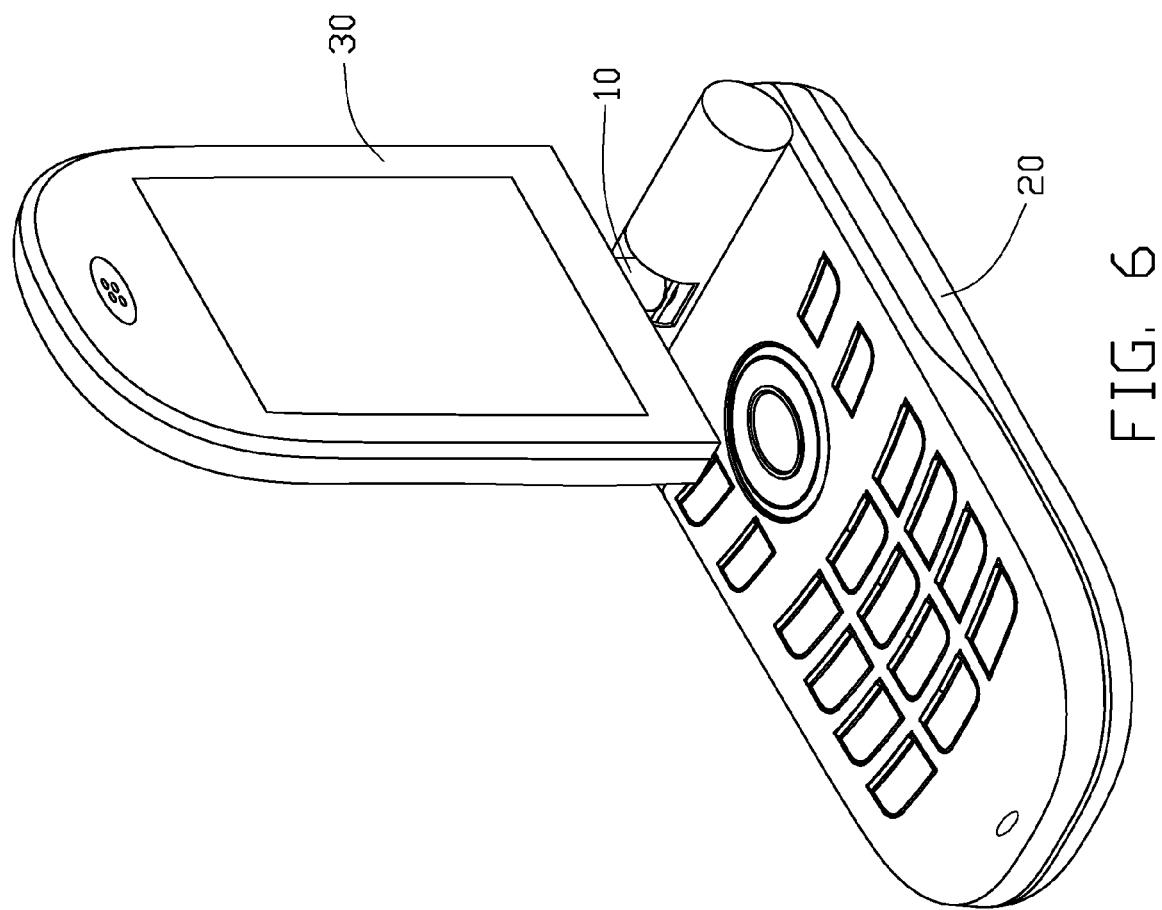
FIG. 6 is an isometric view of a mobile phone with the swivel hinge assembly of FIG. 1, showing a cover of the mobile phone rotatable about a first rotational axis and a second rotational axis.

Referring to FIG. 6, the mobile phone includes a main body 20, a cover 30, and the swivel hinge assembly 10 for rotatably connecting the main body 20 and the cover 30. When the swivel hinge assembly 10 is employed in the mobile phone, the first connecting member 142 of the hinge mechanism 14 and the second connecting member 162 of the hinge follower mechanism 16 are fixed to the main body 20, and the third connecting member 182 of the swivel mechanism 18 is fixed to the cover 30.

In use, when the cover 30 is in a normal starting position in relation to the first rotational axis, the peaks 1508 of the cam 150 are received in the valleys 1526 of the cam follower 152, and the protrusions 1444 of the ring follower 144 are received in the notches 1464 of the positioning ring 146. The normal starting position is typically when the mobile phone is folded up and not in use. In such position, the cover 30 is referred to herein as being in a closed state relative to the main body 20.

When the cover 30 is manually rotated about the first rotational axis, the bracket 12, the positioning ring 146, the cam 150, and the sleeve 156 rotate together with the cover 30 relative to the main body 20. The peaks 1508 slide out of the valleys 1526, the protrusions 1444 slide out of the notches 1464, and the elastic member 148 is driven to be compressed further. The cam 150 can be retained at any position relative to the cam follower 152 during rotation of the cover 30, because the cam surface 1524 of the cam follower 152 is approximately flat. Therefore, the cover 30 can be rotated about the first rotational axis and retained in any desired position relative to the main body 20 between the closed state and an open state. When the cover 30 is rotated to an angle about the first rotational axis, the limiting surface 1552 or the limiting surface 1554 of the first pivot shaft 154 blocks the limiting sheet 1505 of the cam 150. Thus, the cover 30 stops rotating further, and is in an open state relative to the main body 20.

When the cover 30 rotates through each of the predetermined positions, the peaks 1508 of the cam 150 fit into the valleys 1526 of the cam follower 152, and the protrusions 1444 of the ring follower 144 fit into the notches 1464 of the positioning ring 146. In the predetermined positions the elastic member 148 is decompressed. As such, it is more difficult to rotate the cover 30 in the predetermined positions than in other positions because the peaks 1508 are held in the valleys 1526 and the protrusions 1444 are held in the notches 1464. Therefore, the cover 30 can be positioned at such predetermined angles relative to the main body 20 if a user wants. In this embodiment, the predetermined angles are 0 degree and 180 degrees. Alternatively, the predetermined angles may be other values by adjusting the number of the valleys 1526 and the peaks 1508.

It should be understood that, the first connecting member 142 of the hinge mechanism 14 and the second connecting member 162 of the hinge follower mechanism 16 are both fixed to the main body 20 of the mobile phone, so that the cover 30 is stable during rotation. Therefore, forces applied to components of the hinge mechanism 14 are stable. Thus, abrasion of the components of the hinge mechanism 14 is decreased. In addition, when the cover 30 rotates about the first rotational axis, the force for compression the elastic member 148 is large because of the coupling between the ring follower 144 and the positioning ring 146. Therefore, the rotation of the cover 30 is stable, and abrasion of the components of the hinge mechanism 14 is minimal.

When the cover 30 is in a normal starting position in relation to the second rotational axis, the limiting surface 1916 of the third pivot shaft 190 resists the projection 1228 of the bracket 12, and the peaks 1886 of the cam 188 are received in the corresponding valleys 1226 of the bracket 12.

When the cover 30 is manually rotated about the second rotational axis, the third connecting member 182, the cam 188, and the third pivot shaft 190 rotate together with the cover 30 relative to the main body 20. The peaks 1886 of the cam 188 slide out of the valleys 1226 of the bracket 12, and the elastic member 184 is compressed. The cam 188 can be retained at any position relative to the bracket 12, during rotation of the cover 30, because the cam surface 1227 of the bracket 12 is approximately flat. Therefore, the cover 30 can be rotated about the second rotational axis and retained in any desired position relative to the main body 20. When the cover 30 is rotated about the second rotational axis, the limiting surface 1914 of the third pivot shaft 190 resists the projection 1228 of the bracket 12 to prevent the cover 30 from rotating further.

When the cover 30 rotates, about the second rotational axis, through predetermined positions of multiple valleys 1226, the peaks 1886 of the cam 188 are coupled to the valleys 1226 of the bracket 12, and the elastic member 184 is decompressed. As such, greater force must be applied to rotate the cover 30 when the peaks 1886 of the cam 188 are in the valleys 1226 than on the surface 1227 because the elastic member 184 must be compressed to decoupled the peaks 1886 from the valleys 1226. Therefore, the cover 30 can be stably positioned at such predetermined angles relative to the main body 20 if a user wants. In this embodiment, the predetermined angles are 0 degree and 180 degrees. Alternatively, the predetermined angles may be any desired degrees by adjusting the number of the valleys 1226 and the peaks 1886.

In the exemplary embodiment, at least one of the cam 150, the cam follower 152, the bracket 12, and the cam 188 are manufactured by powder metallurgy. Components manufactured by powder metallurgy have good wearability, high precision, high strength, long service life, and low cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A swivel hinge assembly, comprising:
   a base body;
   a hinge mechanism connected to the base body and configured to provide rotation about a first rotational axis, the hinge mechanism comprising a first pivot shaft, a first connecting member, a sleeve, a positioning ring, a ring follower, an elastic member, a cam, and a cam follower, the first pivot shaft extending through the base body, the cam, the cam follower, the elastic member, the sleeve, the positioning ring, the ring follower, and the first connecting member, the cam follower, the ring follower, and the first connecting member being non-rotatable relative to the first pivot shaft, the cam being rotatable relative to the cam follower, wherein a pair of protrusions are formed on an end surface of the ring follower, and an end surface of the positioning ring defines a pair of notches corresponding to the protrusions of the ring follower; and
   a swivel mechanism connected to the base body and configured to provide rotation about a second rotational axis, the swivel mechanism comprising a pivot shaft, a cam, an elastic member, and a connecting member, the pivot shaft of the swivel mechanism extending through the base body, the cam, the elastic member, and the connecting member, the cam and the connecting member being non-rotatable relative to the pivot shaft of the swivel mechanism, the cam being rotatable relative to the base body.

2. The swivel hinge assembly as claimed in claim 1, wherein at least one of the cam of the hinge mechanism, the cam follower of the hinge mechanism, the base body, and the cam of the swivel mechanism are manufactured by powder metallurgy.

3. The swivel hinge assembly as claimed in claim 1, further comprising a hinge follower mechanism, the hinge follower mechanism includes a second connecting member, a sleeve, and a second pivot shaft, the second pivot shaft extends through the base body, the sleeve, and the second connecting member, and an end of the second pivot shaft is fixed to the second connecting member.

4. The swivel hinge assembly as claimed in claim 1, wherein each of the first pivot shaft and the pivot shaft of the swivel mechanism defines a wiring channel for receiving wires.

5. The swivel hinge assembly as claimed in claim 1, wherein a pair of tabs extend out of an edge of the positioning ring, each end of the sleeve defines a pair of cutouts, a tab and an engaging piece extend out of an edge of the cam of the hinge mechanism, the base body defines two engaging grooves on opposite sides, the tabs of the positioning ring are received in the cutouts defined on one end of the sleeve, the tab and the engaging piece are received in the cutouts defined on the other end of the sleeve and the engaging grooves of the base body.

6. The swivel hinge assembly as claimed in claim 5, wherein the first pivot shaft comprises a cap, a block extends out of an edge of the cap, the block has two limiting surfaces, and the limiting surfaces resist the tab of the cam of the hinge mechanism so as to restrict a rotational angle of the swivel hinge assembly about the first rotational axis.

7. An electrical device comprising:
   a first body;
   a second body; and
   a swivel hinge assembly rotatably connecting the first body and the second body and providing biaxial rotation of the first and second bodies relative to each other, the swivel hinge assembly comprising:
   a base body;
   a hinge mechanism connected to the base body and configured to provide rotation about a first rotational axis, the hinge mechanism comprising a first pivot shaft, a first connecting member, a sleeve, a positioning ring, a ring follower, an elastic member, a cam, and a cam follower, the first pivot shaft extending through the base body, the cam, the cam follower, the elastic member, the sleeve, the positioning ring, the ring follower, and the first connecting member, the cam follower, the ring follower, and the first connecting member being non-rotatable relative to the first pivot shaft, the cam being rotatable relative to the cam follower, wherein a pair of protrusions are formed on an end surface of the ring follower, and an end surface of the positioning ring defines a pair of notches corresponding to the protrusions of the ring follower; and
   a swivel mechanism connected to the second body and configured to provide rotation about a second rotational axis, the swivel mechanism comprising a pivot shaft, a cam, an elastic member, and the connecting member, the pivot shaft of the swivel mechanism extending through the base body, the cam, the elastic member, and the connecting member.

8. The electrical device as claimed in claim 7, wherein each of the cam and the cam follower of the hinge mechanism has a cam surface engaging with each other, one of the cam surfaces has at least one peak, the other of the cam surfaces has at least one valley, the at least one peak is received in the at least one valley when the second body is rotated to predetermined positions, and the cover can be rotated about the first rotational axis and retained in any desired position relative to the main body.

9. The electrical device as claimed in claim 7, wherein the base body has a cam surface, the cam of the swivel mechanism has a cam surface, one of the cam surfaces has at least one peak, the other of the cam surfaces has at least one valley, the at least one peak is received in the at least one valley when the second body is rotated to predetermined positions, and the cover can be rotated about the second rotational axis and retained in any desired position relative to the main body.

10. A swivel hinge assembly, comprising:
    a base body;
    a hinge mechanism connected to the base body and configured to provide rotation about a first rotational axis, the hinge mechanism comprising a first pivot shaft, a first connecting member, an elastic member, a cam, and a cam follower, the first pivot shaft extending through the base body, the cam, the cam follower, the elastic member, and the first connecting member, the cam follower, the first connecting member being non-rotatable relative to the first pivot shaft, the cam being rotatable relative to the cam follower; and a swivel mechanism connected to the base body and configured to provide rotation about a second rotational axis, the swivel mechanism comprising a pivot shaft, a cam, an elastic member, a connecting member, and a sleeve, the pivot shaft of the swivel mechanism extending through the base body, the cam, the elastic member, the sleeve, and the connecting member, the cam and the connecting member being non-rotatable relative to the pivot shaft, the cam being rotatable relative to the base body, two ends of the elastic member respectively resisting the cam and the connecting member, and the connecting member being fixed to an end of the pivot shaft.

11. The swivel hinge assembly as claimed in claim 10, wherein a projection is formed on the base body, the pivot shaft of the swivel mechanism comprises a cap, a block extends out of an edge of the cap, the block has two limiting surface, and the limiting surfaces resist the projection of the base body so as to restrict a rotational angle of the swivel hinge assembly about the second rotational axis.

* * * * *